United States Patent
'Sorenson, III et al.

(10) Patent No.: US 9,843,630 B2
(45) Date of Patent: *Dec. 12, 2017

(54) SYSTEM AND METHOD FOR DISTRIBUTED LOAD BALANCING WITH LOAD BALANCER CLIENTS FOR HOSTS

(71) Applicant: Amazon Technologies, Inc., Seattle, WA (US)

(72) Inventors: James Christopher 'Sorenson, III, Seattle, WA (US); David Carl Salyers, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 162 days.

This patent is subject to a terminal disclaimer.

(21) Appl. No.: 14/733,890

(22) Filed: Jun. 8, 2015

(65) Prior Publication Data

US 2015/0304407 A1    Oct. 22, 2015

Related U.S. Application Data

(62) Division of application No. 13/167,557, filed on Jun. 23, 2011, now Pat. No. 9,055,076.

(51) Int. Cl.
*H04L 29/08* (2006.01)

(52) U.S. Cl.
CPC ........ *H04L 67/101* (2013.01); *H04L 67/1004* (2013.01); *H04L 67/1008* (2013.01); *H04L 67/1029* (2013.01); *H04L 67/1002* (2013.01)

(58) Field of Classification Search
CPC ..................... H04L 67/1002; H04L 47/125
See application file for complete search history.

(56) References Cited

U.S. PATENT DOCUMENTS

| | | |
|---|---|---|
| 5,539,883 A | 7/1996 | Allon et al. |
| 5,905,868 A | 5/1999 | Baghai et al. |
| 5,915,095 A | 6/1999 | Miskowiec |
| 6,119,143 A | 9/2000 | Dias et al. |
| 6,128,279 A | 10/2000 | O'Neil et al. |
| 6,128,644 A | 10/2000 | Nozaki |
| 6,178,160 B1 | 1/2001 | Bolton et al. |
| 6,324,580 B1 | 11/2001 | Jindal et al. |

(Continued)

*Primary Examiner* — Tom Y Chang
(74) *Attorney, Agent, or Firm* — Robert C. Kowert; Meyertons, Hood, Kivlin, Kowert & Goetzel, P.C.

(57) ABSTRACT

Embodiments may include a load balancer configured to, for a given packet received from a remote client, select a host computer of a plurality of host computers according to a load balancing protocol, the selection based on load information updates received from the plurality of host computers. Each load information update may indicate a measure of the respective host computer's capacity to service additional connections with remote clients. The load balancer may provide the given packet to the selected host computer for processing by an application component on the selected host computer, and subsequent to determining that a specific application component on one of the plurality of host computers does not have capacity for additional connections based on the load information updates, continue to send packets for existing connections serviced by the specific application component to the respective host computer without sending packets for new connections to that host computer.

20 Claims, 13 Drawing Sheets

(56) References Cited

U.S. PATENT DOCUMENTS

| | | |
|---|---|---|
| 6,327,622 B1 | 12/2001 | Jindal et al. |
| 6,351,775 B1 | 2/2002 | Yu |
| 6,671,259 B1 | 12/2003 | He et al. |
| 7,567,504 B2 | 7/2009 | Darling et al. |
| 7,590,736 B2 | 9/2009 | Hydrie et al. |
| 7,613,822 B2 | 11/2009 | Joy et al. |
| 7,636,917 B2 | 12/2009 | Darling et al. |
| 8,073,952 B2 | 12/2011 | Yoo et al. |
| 2001/0052016 A1 | 12/2001 | Skene et al. |
| 2002/0029260 A1 | 3/2002 | Dobbins et al. |
| 2003/0023767 A1 | 1/2003 | Brabson et al. |
| 2003/0105797 A1 | 6/2003 | Dolev et al. |
| 2004/0010588 A1 | 1/2004 | Slater et al. |
| 2004/0264374 A1 | 12/2004 | Yu et al. |
| 2005/0055435 A1 | 3/2005 | Gbadegesin et al. |
| 2006/0233155 A1 | 10/2006 | Srivastava |
| 2006/0271655 A1* | 11/2006 | Yoon ................... H04L 67/1008 709/223 |
| 2007/0283419 A1 | 12/2007 | Afergan et al. |
| 2008/0301333 A1 | 12/2008 | Butler et al. |
| 2009/0210431 A1 | 8/2009 | Marinkovic et al. |
| 2009/0307334 A1 | 12/2009 | Maltz et al. |
| 2010/0036903 A1 | 2/2010 | Ahmad et al. |
| 2010/0274893 A1 | 10/2010 | Abdelal et al. |
| 2011/0277027 A1 | 11/2011 | Hayton et al. |

\* cited by examiner

SYSTEM AND METHOD FOR DISTRIBUTED LOAD BALANCING WITH LOAD BALANCER CLIENTS FOR HOSTS

This application is a divisional of U.S. application Ser. No. 13/167,557, filed Jun. 23, 2011, now U.S. Pat. No. 9,055,076, which is hereby incorporated by reference in its entirety.

BACKGROUND

Large networks that service client requests often benefit from the use of load balancers. For instance, in a network that includes multiple back-end servers that process client requests, a front-end load balancer may attempt to evenly distribute incoming requests across the servers in order to prevent any one server from becoming overloaded. While load balancers generally improve the overall efficiency of large distributed networks with many servers, there are circumstances in which the shortcomings of certain load balancers may outweigh the performance gained from their load balancing features. For instance, certain systems require large transmission control protocol ("TCP") window sizes, which can be very demanding on a load balancer that has fixed memory resources. In some cases, the load balancer may attempt to shrink window sizes to compensate for inadequate memory resources; however, this typically results in poor connection performance for clients as shrinking window sizes may cause a sharp increase in the ratio of overhead data to useful data for a given connection. Direct server return (DSR) is a technique that can overcome some limitations of load balancers in certain implementations. However, DSR's reliance on Media Access Control (MAC) addresses for packet delivery may be unacceptable for complex network topologies.

Additionally, load balancers typically perform decisions based on coarse characteristics of back-end servers. For instance, in some cases, load balancers may base decisions on information that specifies whether each back-end server is "up" or "down" (e.g., either operating or not operating, respectively). Furthermore, in systems with multiple load balancers, different groups of back-end servers are typically assigned to specific load balancers. To move a back-end server from the distribution domain of one load balancer to another typically requires terminating active connections on that back-end server as well as performing configuration changes on the relevant load balancers.

Figure 1:
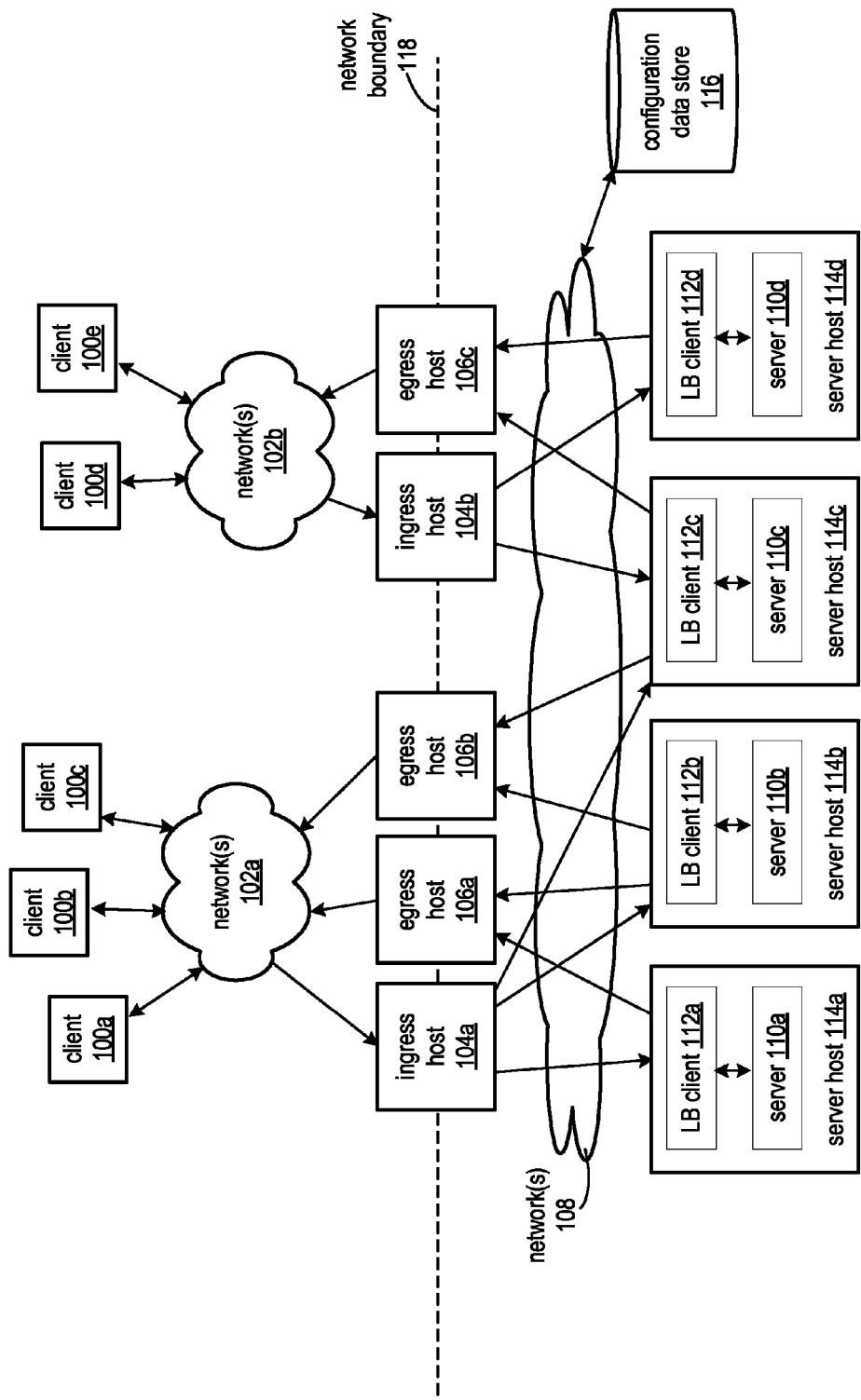
FIG. 1 illustrates a block diagram of an example system configuration including ingress hosts, egress hosts, server hosts, and remote clients, according to some embodiments.

While the system and method for distributed load balancing with load balancer clients for hosts is described herein by way of example for several embodiments and illustrative drawings, those skilled in the art will recognize that the system and method for distributed load balancing with load balancer clients for hosts is not limited to the embodiments or drawings described. It should be understood, that the drawings and detailed description thereto are not intended to limit the system and method for distributed load balancing with load balancer clients for hosts to the particular form disclosed, but on the contrary, the intention is to cover all modifications, equivalents and alternatives falling within the spirit and scope of the system and method for distributed load balancing with load balancer clients for hosts as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for distributed load balancing with load balancer clients for hosts are described. As described in more detail below, embodiments may include components configured to perform distributed load balancing techniques that distribute data packets to back-end host systems (e.g., web servers). For instance, a client computer may send request packets and a host computer may send response packets to establish a packet connection (e.g., as part of a handshaking protocol); embodiments may utilize one or more load balancers to distribute such connections across multiple back-end host computers according to a load balancing protocol. In many cases, the network(s) between the load balancers and the multiple back-end host computers may be relatively complex networks including any of a variety of networking components including but not limited to routers (e.g., IP routers), switches, hubs, bridges and other components. As such, embodiments may avoid reliance on routing techniques that require knowledge of the physical network topology (e.g., conventional DSR) as the complexity and/or fluid (e.g., frequently changing) nature of such topology renders such reliance ineffective or impractical. Instead, embodiments described herein may enable inbound packets to be routed to back-end hosts according one or more network protocols (e.g., Internet Protocol (IP)). In these cases, when a packet traverses the load balanced system, the original source address (e.g., the client's network address) may be preserved as the source address within the packet. In this way, a receiving system (e.g., a back-end host) may perform any access control functions that rely on the original source address. Furthermore, when a packet traverses the load balanced system, the destination address of the packet may be updated to reflect the next destination within the load balanced system, whether that destination is a back-end system or some intermediate destination between the entry point of the load balanced system and the back-end system. As such, the packet remains routable according to the aforesaid networking protocols.

In various embodiments, in addition to the original source address (e.g., the client's network address) and the address of the next destination within the network path traversed by a packet within the load balanced system, one or more components of the load balanced system may utilize the original destination network address to which a client's request packet was sent. For instance, a host server that sends a response packet may write that original destination address as the source of the response packet. In this way, when a response packet is sent to a client, the response packet may appear (from the client's perspective) to originate from the network address to which the client sent the original request packet. As an example, this original network address may be a network address of the entry point into the load balanced system whereas the component that sends the response packet may have a different network address. Furthermore, some connection types (e.g., cryptographically protected connections) may prevent packets from conveying the original destination address through conventional techniques (e.g., x-forwarded-for). As such, embodiments may provide back-end hosts with knowledge of a packet's original destination address (e.g., an external network address for the load balanced system) without actually specifying that address within information of the packet that is delivered to that back-end host. As described in more detail below, the manner in which the original client's network address is conveyed to the back-end host (without including that address in information of the packet) may include sending packets to a specific port on the back-end host. This specific port may have a one-to-one mapping or association with the original destination address. In this way, the back-end host may compare the port on which a packet is received to this one-to-one mapping in order to determine the original destination address. As described above, this original destination address may be written as the source of any response packets sent to the client such that the response packets appear to (from the client's perspective) to originate from the network address to which the client sent the original request packet.

In addition to preserving access control functionality for back-end hosts, embodiments may also shift connection endpoints from the load balancers to one or more of the back-end hosts. As described in more detail below, crypto-graphically protected connections may be terminated by load balancer clients instead of the actual load balancers. Load balancer clients may be implemented on the actual back-end hosts that service connections (or on other hosts in some cases). Whether implemented on the actual back-end host or another system, a back-end host's load balancer client may be configured to terminate connections including but not limited to cryptographically protected connections. In this way, the load balancer clients may accommodate connections with large TCP window sizes without exerting undue stress on the hardware resources of the load balancers. Furthermore, in many cases, the hardware on which the load balancer clients are implemented may be less expensive than the load balancers, thereby representing a cost savings for the entity that owns the load balanced system.

Embodiments may also be configured to perform connection level load balancing based on load updates from back-end hosts. While the actual load balancing protocol may be performed by one or more load balancers, a given back-end host may influence or partially control the quantity of connections that it receives by reporting specific types of load updates to one or more of the load balancers. For instance, a back-end host is likely to receive more connections from a particular load balancer after providing that load balancer with a load update that specifies the back-end host is lightly loaded or otherwise has capacity to service additional connections. Similarly, a back-end host is likely to receive fewer connections from a particular load balancer after providing that load balancer with a load update that specifies the back-end host is heavily loaded or otherwise has little capacity to service additional connections. As described in more detail below, the back-end hosts may be configured to concurrently report these types of load updates to multiple load balancers. In this way, a back-end host may use load updates to control the maximum quantity of connections that it may receive from different load balancers. As a given load balancer may not have knowledge of the connection load exerted on a host by other load balancers, the different load updates sent to different load balancers may enable a given back-end host to service connections from those balancers without the risk that one of the load balancer swill overwhelm the back-end host with too many connections. For example, the back-end host may determine its total capacity to service connections and ensure that the individual load updates sent to different load balancers do not collectively indicate a total load that exceeds this capacity. For instance, if a back-end host determines that it has capacity to service 400 additional connections, the back-end host may send to one load balancer a load update that indicates the host is able to accept 100 additional connections and send to another load balancer a load update that indicates the host is willing to accept 300 additional connections.

FIG. 1 illustrates a block diagram of an example system configuration in which distributed load balancing may be implemented. As illustrated one or more client systems (or "clients") 100a-e may be configured to communicate with one or more network components through networks 102a-b, which may be configured in a manner similar to that of network 1285 of FIG. 12 described below. For example, any of the illustrated clients may represent a computer system that requests information or data from server hosts 114a-d. One example of a client system is described in more detail below with respect to FIG. 3. Generally, clients may seek to establish connections through which to communicate with one or more server hosts in order to exchange information. As described in more detail below, these connections may be cryptographically-protected (such as SSL connections). In various embodiments, the illustrated server hosts may provide information or data representing a marketplace of goods or services that may be purchased by users of the clients systems. For instance, a user may utilize a client to log on to an electronic marketplace to purchase books or music. The server hosts may provide product detail pages that represent books, music, or other products available for purchase. One example of the manner in which a connection between a client and a server host may be established is described below with respect to FIG. 2.

In various embodiments, the system may include one or more ingress hosts 104a-b for processing inbound data from clients 100a-e. The ingress hosts may perform be responsible for receiving incoming requests and distributing these requests to server hosts 114a-e according to a load balancing protocol. While the load balancing aspects of the ingress hosts are described in more detail below, the load balancing techniques utilized by each ingress hosts generally seek to distribute work among the server hosts such that the hosts are evenly loaded with connections to remote clients. In some embodiments, different server hosts may have different capabilities. For instance, one server host may be capable of servicing 10 times the number of connections that can be serviced by a less capable server host. For instance, some hosts may include more hardware resources (e.g., processors, memory, etc.) than other hosts. As described in more detail below, each server host may periodically or aperiodically report information about its capacity to perform service additional connections with remote clients to the ingress hosts. The ingress hosts may take this load information into consideration when distributing connections among the server hosts.

For new and existing connections, ingress hosts may forward packets from these connections to the appropriate server hosts over one or more network(s) 108, which may be configured in a manner similar to that of network 1285 of FIG. 12 described below. The load balancer (LB) clients 112a-d may receive such packets from the ingress hosts and pass the relevant information to servers 110a-d. The load balancer client may be responsible for decrypting encrypted packets and other duties as described in more detail below with respect to FIG. 2. Furthermore, while each server host 114a-d is illustrated as including a server 110a-d, the configuration need not be limited to this type of application component. In various embodiments, servers and LB clients may be implemented in software, hardware, or some combination thereof. As illustrated, the load balancer clients may be implemented on the same hosts as the server application. However, in various embodiments, the load balancer clients may be implemented on different hosts. In some cases, each load balancer client may be dedicated to a respective one of servers 110a-d.

After receiving a packet (or information from a packet) from the respective LB client, the server component may process the information and generate a response to the remote client. For instance, the response might be an acknowledgement (a transmission control protocol ("TCP") ACK) to a connection setup request (e.g., a TCP SYN) submitted by one of the clients. In another example, a response might include data or information requested by the client, such as network-based content (e.g., product detail pages for the electronic marketplace mentioned above). As described in more detail below, the generated response may be sent direct from the server hosts or may be sent to one of egress hosts 106a-c, which may be responsible for forwarding response packets from the server hosts to the appropriate clients.

It should be noted that each server 110a-d may accept traffic from any number of ingress hosts. In various embodiments, this system property may provide efficient utilization of the system as less server capacity needs to be reserved in the event of a load balancer failure. Furthermore, the number of egress hosts may differ from the number of ingress hosts. For example, depending on the specific implementation, outbound traffic may be larger than inbound traffic on average over time. In one non-limiting example, the volume of outbound traffic could be twice as much as that of inbound traffic. Accordingly, in various embodiments, servers may be added in proportion to the amount of traffic flowing in each direction. As the limiting factor for traffic through the ingress and egress host may be packets per second in various embodiments, splitting the roles in this manner may enable ingress hosts to focus on receiving packets such that a larger volume of inbound traffic may be handled (relative to traffic capacity of ingress hosts absent the assistance of egress hosts processing outbound traffic).

The illustrated system may also include a configuration data store 116, which may be utilized to store port-to-address mappings. For example, the ingress hosts may service multiple network addresses to which clients may send requests. In various embodiments, multiple addresses may route to the same ingress host (e.g., as specified by a Domain Name System (DNS). These addresses may be mapped to specific ports for ingress hosts, server hosts and egress hosts. In this way, when a packet is passed to a component on a specific port within the illustrated system, that component may compare the port number to the mappings of the configuration data store to determine the associated network address. This process is described in more detail below with respect to FIG. 2. In general, this mapping information may enable the ingress hosts, server hosts and egress hosts to determine a network address associated with a packet even though the packet itself may not include information that specifies that address.

In the illustrated embodiment, the network boundary 118 may isolate the server side network from networks 102a-b. For instance, in addition to the other functionality described herein, ingress and egress hosts may perform network firewall duties to prevent unauthorized access to the server side components. Accordingly, in various instances herein, the server side components (e.g., ingress hosts, egress hosts, server hosts) may be referred to as collectively forming a particular network region. Generally speaking, this particular network region may provide a level of security that is higher than that provide by outside networks (e.g., the Internet). However, some embodiments may be implemented without requiring this level of security.

In various embodiments, this particular network region may be accessible to the remote client through a plurality of network addresses, such as multiple virtual internet protocol (IP) address that route to different ones of the ingress hosts. These addresses may be refereed to herein as public addresses as they are the addresses that systems (e.g., remote clients) outside of this particular network region For example, a client may send a request to a public address that is one of multiple public addresses that route to ingress host 104a. In various embodiments, components of network(s) 102a-b may be configured such that different public address route to different ports on the respective ingress host. In this way, if the original destination address specified by the client in a packet is overwritten en route to the ingress host, the ingress host may determine which public address the client originally sent the packet to by determining which public address is associated with whatever port the ingress host received the packet on. This mapping of public addresses to ports may be stored within configuration data store 116 for each ingress host. Alternatively, each ingress host may store this information locally. In various embodiments, each server host and each egress host may also store port to public address mappings within configuration data store 116. For a given component (e.g., server host or egress host), this mapping information may specific one-to-one mappings between ports of that component and public addresses of the particular network region. In this way, when that component receives a packet on a particular port, the component may determine which public address the packet associated with even if the packet itself does not include information specifying that address. In various embodiments, the port mapping information (stored in configuration data store 116) for any component of the particular network region may be accessible to any other component of the particular network region. In this way, when a first component needs to convey the public address associated with a packet to a second component (without writing the public address within the packet), the first component may send the packet to the second component's port that is associated with that public address within the mapping information. Use of the mapping information in this manner is described in more detail with respect to FIG. 2 below.

Figure 2:
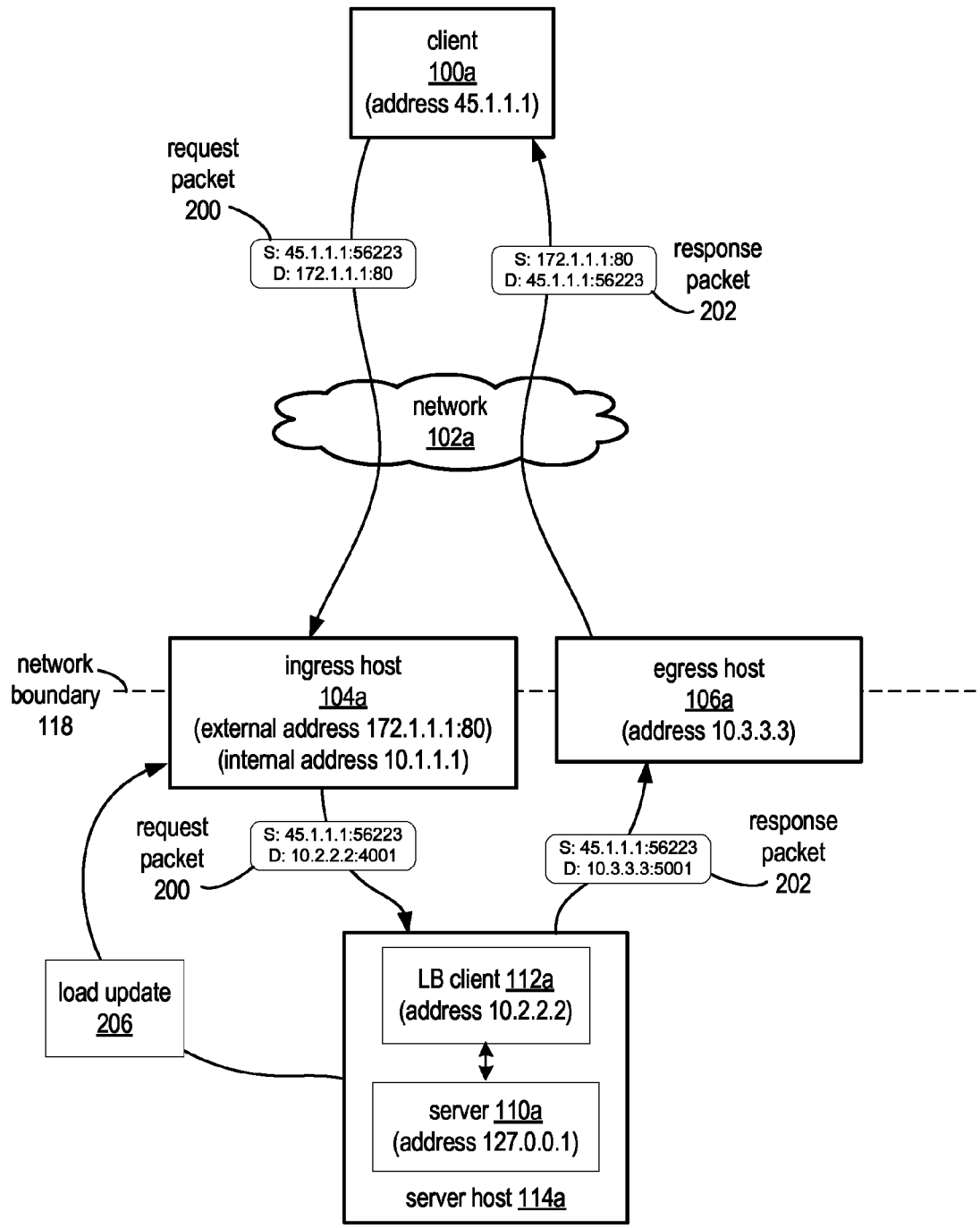
FIG. 2 illustrates a flow diagram for handling request and response packets including the ability to retain the client's network address in the request packet for evaluation by the server host as well as the ability for the server host to serve as a connection endpoint (e.g., as opposed to a connection terminating on the ingress host), according to some embodiments.

FIG. 2 illustrates a data flow diagram that illustrates packet flow according to various embodiments. The illustrated system may utilize distributed direct server return (DDSR) to move traffic around the network while retaining the source network address on the packet (i.e., the network address of the remote client that sent the packet). Utilizing DDSR enables a cryptographically-protected connection to be terminated at the server host (e.g., decrypted at the server host) instead of the load balancer (e.g., the ingress host) while also ensuring that the server host has knowledge of the source network address for enforcing access control policies.

In the illustrated embodiment, client 100*a* may send a request packet 200 to the example network address 172.1.1.1:80, which may be the external network address of the ingress host 104*a* in the illustrated embodiment. In various embodiments, request packet 200 may be routed to the ingress host according to a domain name system (DNS) and the open shortest path first (OSPF) routing protocol. Note that the external network address may be one of multiple different external addresses that network 102*a* (e.g., the Internet) routes to the same ingress host 104*a*, which has an example internal network address of 10.1.1.1 in the illustrated embodiment (e.g., the address that components on the server side of the illustrated network boundary use to address the ingress host).

Ingress host 104*a* may include a load balancer (e.g., load balancer 400 described in more detail below). The ingress host may utilize the load balancer to select a host to which the request packet is to be sent. In various embodiments, this selection may be performed according to a load balancing protocol and may also be based on load information updates from the server hosts, which is described in more detail with respect to subsequent figures. In the illustrated example, the ingress host selects server host 114*a* as the recipient server. To send the packet to the server host, ingress host 104*a* may rewrite the destination address of the request packet to be the destination address of the selected server host 114*a*. In the illustrated embodiment, the address utilized is the address of LB client 112*a* (10.2.2.2). Furthermore, ingress host 104*a* also selects a particular port to send the packet to. This port may be selected based on the port mapping information for server host 104*a*. This mapping information may be specified by load update 206. Load updates are described in more detail with respect to FIG. 6 but generally may include information that specifies a specific port on which the server host is willing to receive connections and an indication of the quantity of additional connections that server host is willing to accept. In some cases, this information may be stored in a configuration data store 116, although this is not required in various embodiments. The ingress host may select the particular port that maps to the original destination address (172.1.1.1:80) within this mapping information. In this way, the ingress host may convey the original destination address of the packet to the server host without the original destination address being included in the packet (because the host server can use its mapping information to determine the original destination address from the port number of the entry port). In various embodiments, this technique may be utilized when handling packets for encrypted connections, in which case the ingress host may not be able to perform the requisite packet inspection (e.g., a layer 7 inspection) that would be needed to insert the original destination address within the packet. Similarly, the packet encryption may prevent alternative techniques (e.g., Hypertext Transfer Protocol's x-forwarded-for) from being utilized. In the illustrated embodiment, the example port number selected is port 4001.

After selecting the server host according to the load balancing protocol and selecting the specific port number according to the mapping information for the selected server host, the ingress host may send the packet to the server host, as illustrated by request packet 200. Additionally, when the ingress host sends the request packet to server host 114*a*, the ingress host may ensure that the packet's source header continues to indicate the client's network address as the source address. Furthermore, the destination header specifies an address of the server host 10.2.2.2 (in this case the address of the LB client) as well as the port number selected according to the techniques described above (port 4001). In the illustrated embodiment, the entire address is expressed in socket format as 10.2.2.2:4001.

By utilizing the techniques described herein, the ingress host may ensure that the packet will arrive at the correct server host (and port) even if the packet is to traverse one or more routers (e.g., IP routers) on the way to the server host. For instance, conventional direct server return's (DSR) reliance on Media Access Control (MAC) addresses would fail under this scenario. By utilizing the techniques described above, the network topology may be complex and even change over time; as long as the packet has the correct network address (e.g., IP address) of the server host, the packet can be routed to that server host correctly. Furthermore, by utilizing the techniques described herein, when the ingress host sends the request packet, the packet continues to specify the client network address 45.1.1.1:56223 as the source. In this way, the server host may successfully evaluate any access control policies that depend on the client network address. For instance, some access control policies may specify white-lists or blacks lists of specific client network address that are permitted or prohibited access to information (e.g., a data object) of the server host.

If the requisite access control policies completed successfully, the LB client may pass information from the packet to be processed by server 110*a*. If the packet includes encrypted information (e.g., as is the case for SSL connections), the LB client may decrypt encrypted information before providing it to server 110*a*. In other words, whether handling encrypted or unencrypted packets, the LB client 112*a* may serve as the endpoint between remote clients and server host 114*a*. Furthermore, the LB client may pass any necessary information to server 110*a* through any of a variety of communication protocols. In one non-limiting example, the LB client forwards information to the server over HTTP to the address of the server component (127.0.0.1). The server (or other application component) may generate a response packet 202 which the LB client may send to the egress host.

The LB client may send response packet 202 to the egress host in a manner similar to that utilized by the ingress host when sending the request packet to the server host. For instance, the LB client may ensure that the source address of packet 202 is also the network address of the client (in this case 45.1.1.1:56223). (In this way, egress host 106*a* will know to which address the response packet should be sent.) Furthermore, the LB client may ensure that the destination address specifies the network address of the egress host and the port of the egress host that maps to the original network address (172.1.1.1:80) that the client sent its request to. This port to network address mapping may be specified by the mapping information in configuration data store 116. In this way, when egress host receives the response packet, the egress host may rewrite the source address of the packet to be equal to this original network address. In this way, when response packet 202 arrives at client 110*a*, it will appear to the client as if the response packet was sent from the same address to which the client sent request packet 200.

As described above, the LB client may serve as the server-side endpoint for any connection with remote clients. In this way, the system may avoid scenarios in which the ingress hosts may become a traffic bottleneck, such as when processing large TCP windows of data. By utilizing the techniques described herein to cause connections to terminate at the LB client, the capacity (e.g., memory, processing cycles, throughput, etc.) of the server host 114*a* may bear the burden of handling the data of the connection. In some cases, the ingress host may even leave the payload of incoming packets on the network interface buffer (of the hosts network interface card) and evaluate/manipulate the headers only. These techniques may provide significant cost savings in scenarios where load balancer hardware (e.g., the ingress hosts) exceeds the costs of server host hardware because the quantity of ingress hosts may be minimized or reduced.

Figure 3:
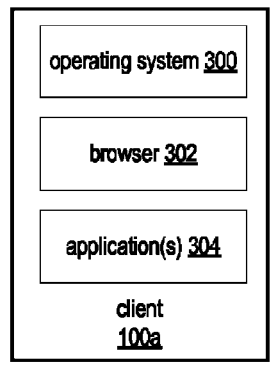
FIG. 3 illustrates a block diagram of an example remote client, according to some embodiments.
Figure 4:
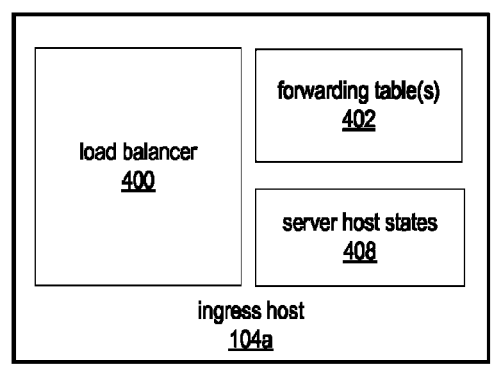
FIG. 4 illustrates a block diagram of an example ingress host, according to some embodiments.
Figure 5:
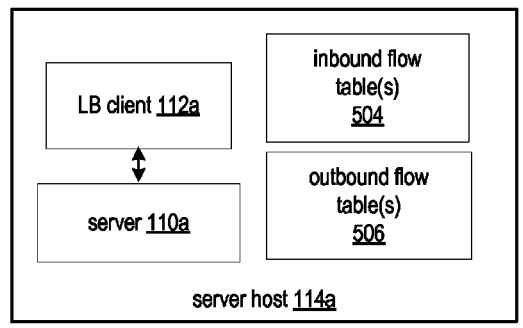
FIG. 5 illustrates a block diagram of an example server host, according to some embodiments.

In various embodiments, the items and components described above may include elements not illustrated in previous Figures. FIGS. 3-5 provide additional details as to the possible components of the clients, ingress hosts and server hosts described above. FIG. 3 illustrates a block diagram of a client computer, according to some embodiments. In various embodiments, client 100*a* may be a computer, such as computer 1200 of FIG. 12. Furthermore, while the illustrated client is client 100*a*, any of clients 100*b-e* may be configured in a similar manner. In the illustrated embodiments, the client may include an operating system 300 and browser 302 (e.g., a web browser or other network-based browser). In various embodiments, the client requests described herein may originate from browser 302. In other embodiments, applications 304 may reside on the client. These applications may also initiate request and other packets to be sent to the server hosts.

FIG. 4 illustrates a block diagram of an ingress host, according to some embodiments. In various embodiments, ingress host 104*a* may be a computer, such as computer 1200 of FIG. 12. Furthermore, while the illustrated host is ingress host 104*a*, any of the ingress hosts may be configured in a similar manner. In the illustrated embodiment, the ingress may include a load balancer 400. The load balancer 400 may distribute incoming packets to server hosts according to one or more load balancing protocols (e.g., a round robin protocol). As described in more detail below with respect to FIGS. 6-8*b*, the load balancing protocol utilized by load balancer 400 determine a particular service host to route a packet to based on load information updates received from the various service hosts. In various embodiments, through reporting different levels of load over time, this may enable the server hosts to exercise some level of control over the load balancing process (which is also described in more detail below with respect to FIGS. 6-8*b*). Generally speaking, in addition to the rules set forth by the chosen load balancing protocol, the load balancer may favor server hosts that have a higher capacity to handle connections with remote clients (e.g., lightly loaded server hosts) over hosts that have a relatively lower capacity to handle connections with remote clients (e.g., heavily loaded server hosts).

Ingress hosts may also include forwarding tables 402 for recording connections between remote clients and server hosts. In various embodiments, tables 402 may specify different states for various connections including but not limited to an initial indicating that a connection has been established, and a closed state indicating that a connection is closed or in the process of being closed. In various embodiments the forwarding table may be keyed using a connection or flow identifier based on packet tuples. For instance, a tuple may include but is not limited to some combination of the client address and the server side address (e.g., the external network address to which the client is communicating, such as 172.1.1.1:80 in FIG. 2) for the connection. In various embodiments, when the load balancer receives a packet for a connection that has already been established and is active according to the forwarding table, the load balancer may forward the packet to the host server specified by the forwarding table without applying a load balancing protocol. In other words, in various embodiments, the load balancer may load balance connections by applying a load balancing protocol to the initial packet(s) (e.g., handshake packets) associated with establishing a new connection. After a connection is established, the packets may be forwarded according to forwarding tables 402. As described above with respect to FIG. 2, by sending a packet over the correct port, the ingress host may convey the original destination address of the packet (e.g., the address to which the remote client sent the packet) to the recipient server host without that address actually being included in the packet. In various embodiments, the information that specifies which port a given server host is to receive packets is stored in server hosts states 408, which may be based on the load updates reported by the server hosts (e.g., receiving ports and respective capacity for each port).

Ingress hosts may also store server host states 408 locally. In various embodiments, this information may represent a local cache of the load information updates described in more detail below with respect to FIGS. 6-8*b*. Generally, this information may specify up-to-date (e.g., near real-time) load or capacity information for each of the server hosts on a per-port basis. In addition to the prescribed rules of the load balancing protocol, the load balancer may use this information for determining where to distribute new connections. For instance, in an example where load information indicates different states (e.g., lightly loaded, moderately loaded, heavily loaded, no more connections accepted), the load balancer may utilize a round-robin load balancing protocol in conjunction with the currents load states. For instance, the load balancer may round-robin new connections to each host in the lowest load category that still has hosts in it. In other cases, server host states 408 may specify different ports of the server hosts and, for each port, a respective connection capacity that the respective host is capable of accommodating. The server host states 408 may be updated periodically or aperiodically as the ingress server receives new load updates from load balancer clients, such as the load updates described in more detail below with respect to FIGS. 6-8b.

FIG. 5 illustrates a block diagram of server host, according to some embodiments. In various embodiments, server host 114a may be a computer, such as computer 1200 of FIG. 12. Furthermore, while the illustrated host is server host 114a, any of the server hosts may be configured in a similar manner. In the illustrated embodiment, the server host may include a LB client 112a for accepting incoming connection and performing any necessary decryption. As described above, the LB client may serve as the server-side endpoint for any connection with remote clients. In this way, the system may avoid scenarios in which the ingress hosts may become a traffic bottleneck, such as when processing large TCP windows of data. The server host may also include a server 110a (e.g., a server application, process or other component) configured to process requests from the remote clients. In one non-limiting example, server 110a is a web server configured to respond to client requests with web page data. In another non-limiting example, server 110a may serve content associated with an electronic marketplace, such as product detail pages or transaction information. Any of this information may be provided in response to remote client requests, such as the request packets described above. Furthermore, the responses provided by server 110a may be returned as one or more response packets to the respective remote client.

In various embodiments, the server host may also include inbound flow table(s) 504. In various embodiments, these tables may map inbound connections or packet flows (e.g., as identified by packet tuples) to specific public addresses serviced by the ingress host. In this way, when a packet is received on a specific port (e.g., request packet 200), the server host may determine what public address the client sent that packet to (e.g., 172.1.1.1:80 in FIG. 2). The server host may also include outbound flow tables 506, which may map connections or packet flows (e.g., as identified by packet tuples) to different ports of the egress hosts. This table may in some cases serve as a local cache of information from configuration data store 116. As described above with respect to FIG. 2, by sending a packet over the correct port, the server host may convey the original destination address of the packet (e.g., the address to which the remote client sent the packet) to the egress host without that address actually being included in the packet. Furthermore, by utilizing tables 502 and 504 keyed to connection or flow identifiers (e.g., based on packet tuples), embodiments may ensure that outbound packets of a particular connection are consistently routed through the same egress server thereby preserving packet ordering on the client side in many cases.

Furthermore, as described above, the server hosts may utilize the client's network address to implement access control policies. For instance, server 110a may validate the client's network address against an access control policy prior to giving that client access to certain information, such as customer account information or protected data objects. For instance, if the client's network address is not permitted per the access control policy, requests from that client may be rejected. To ensure that this access control evaluation may be performed by server 110a, load balancer client 112a may provide the client's network address to server 110a through any communication technique including but not limited to HTTP's x-forwarded-for. Note that in various embodiments the load balancer client 112a may utilize x-forwarded-for to convey the client's network address as communication between the load balancer client and the server component need not be cryptographically protected even in cases where the connection between the external client and the load balancer are cryptographically protected.

Figure 6:
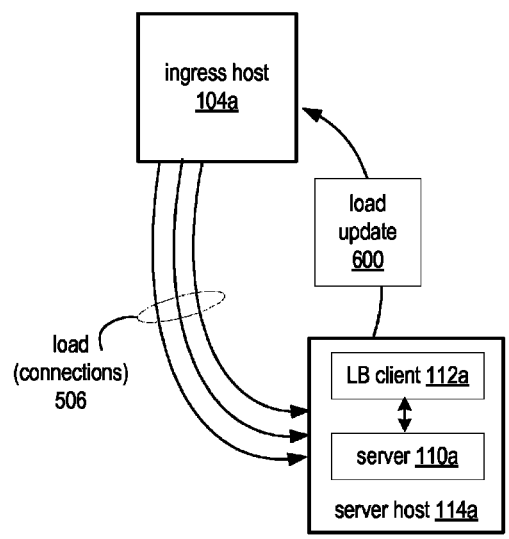
FIG. 6 illustrates a flow diagram of the load information reporting process between a server host and ingress host (e.g., load balancer), according to some embodiments.

As described above, the server hosts may be configured to report load information updates to the ingress hosts. Additionally, the ingress hosts may be configured to utilize this information to throttle the quantity of connections that are given to the individual server hosts. FIG. 6 illustrates a flow diagram illustrating load reporting and load distribution, according to some embodiments. In the illustrated embodiment, server host 114a may provide one or more load information updates (or simply "load updates") 600 to ingress host 104a. In various embodiments, load updates may be provided from server hosts to ingress hosts on a periodic or aperiodic basis. Generally, the load updates may specify a server host's capacity to service additional connections with remote clients. For instance, in various embodiments, a given load update 600 may specify a quantity of additional connections that the serer host is capable of handling. In some cases, this may be a quantity determined by the server host itself. In other cases, the load information update may specify information that the ingress host may use to infer the server hosts capacity to accept additional connections. For instance, a given load update may specify a current number of active connections on the server host, current bandwidth utilization of the server host, current processor utilization of the server host, current memory utilization of the server host, or some other performance metric associated with the server host. In yet other cases, load update 600 may specify a load level from a predefined scale of multiple load levels. For instance, such a scale may include a range of load levels from lightly loaded, to moderately loaded, to heavily loaded, to a level in which no more connections are accepted by the server host. In various embodiments, load updates from a server host may be port specific. For instance, the load updates may specify different quantities of connections that the server host is willing to accept on different port numbers and these port numbers may vary across different load balancers. For example, as described above, if a server host determines that it has capacity to service 400 additional connections, the server host may send to one load balancer a load update that indicates the host is able to accept 100 additional connections and send to another load balancer a load update that indicates the host is willing to accept 300 additional connections. In some cases, a server host may provide different load updates for different ports to the same load balancer. For instance, for the same load balancer, the server host may use load updates to specify capacity for unprotected connections on one port and capacity for cryptographically protected connections (e.g., SSL connections) on another port.

In various embodiments, the configuration of FIG. 6 may differ from conventional load balancer polling techniques in a number of respects. For instance, instead of the load balancer polling the back-end hosts to determine whether the hosts are up or down, the load balancer clients may proactively report the load updates described herein to the load balancers of the ingress hosts. Furthermore, instead of simply indicating whether a server is up or down, the load updates may give some indication as to the actual capacity the server host has to service additional connections. For example, as described above, the load balancer client may specify the different capacities for different ports.

As described above, the ingress host may throttle the amount of connections to the server host based on the load updates. In various embodiments, this throttle may be a result of the manner in which the load balancer of the ingress host incorporates the load updates into the load balancer protocol for selecting a server host. Generally, server hosts with more capacity to handle additional connections may be assigned more connections that server hosts with less capacity to handle additional connections. In some embodiments, the capacity of hosts may change over time as connections are closed or opened. This variability may be reflected in the load updates that the server hosts provide to the ingress hosts.

Figure 7A:
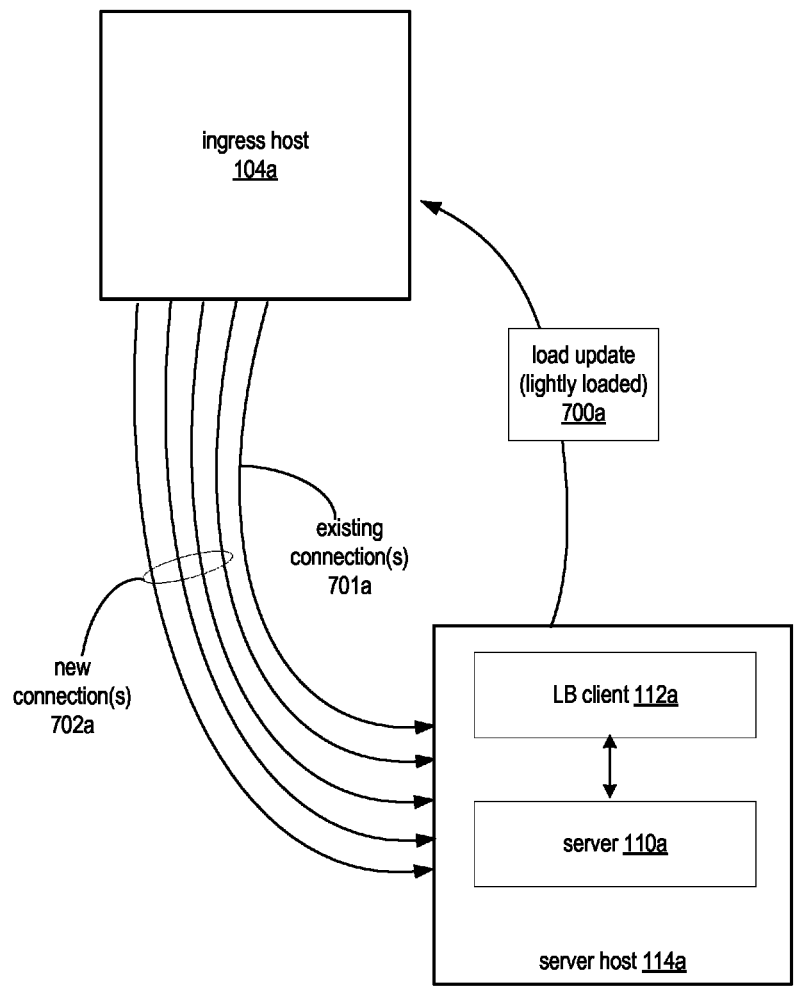
FIGS. 7A-7D illustrates flow diagrams illustrating the manner in which connection volume fluctuates in response to different load updates reported by server hosts, according to some embodiments.
Figure 7B:
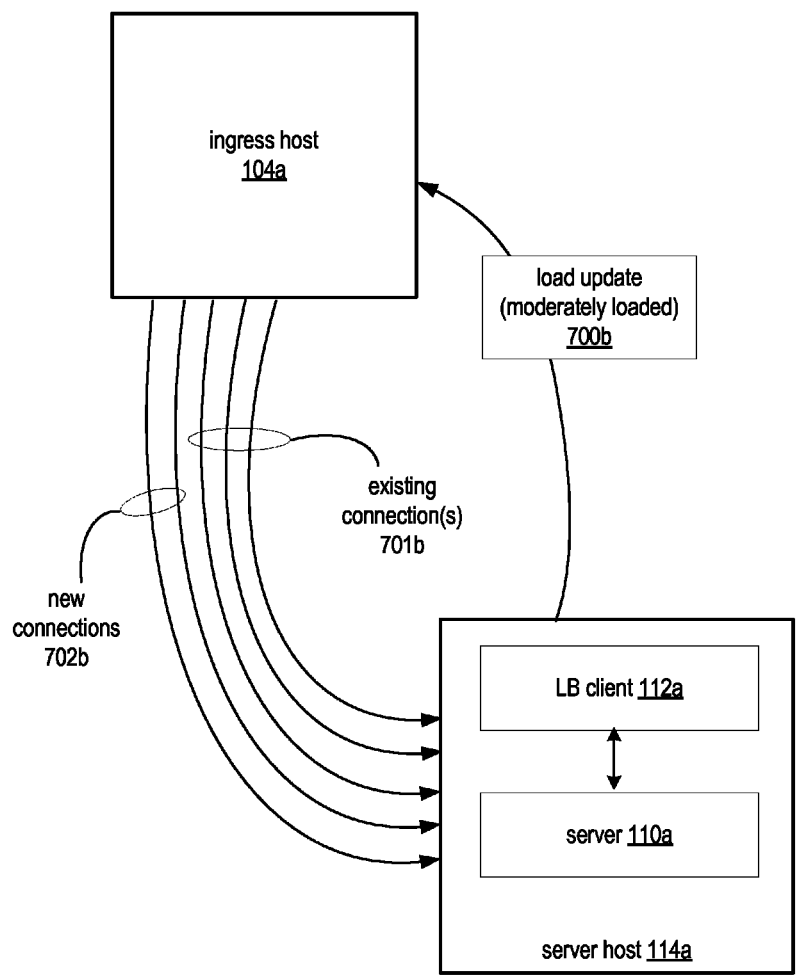
Figure 7C:
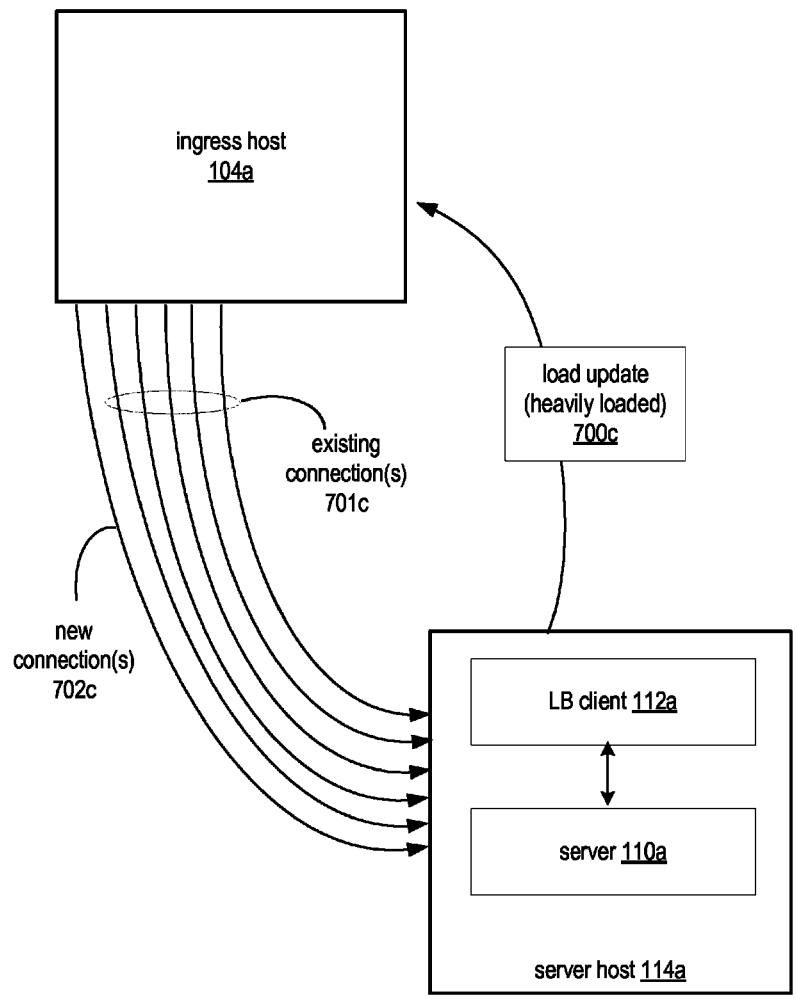
Figure 7D:
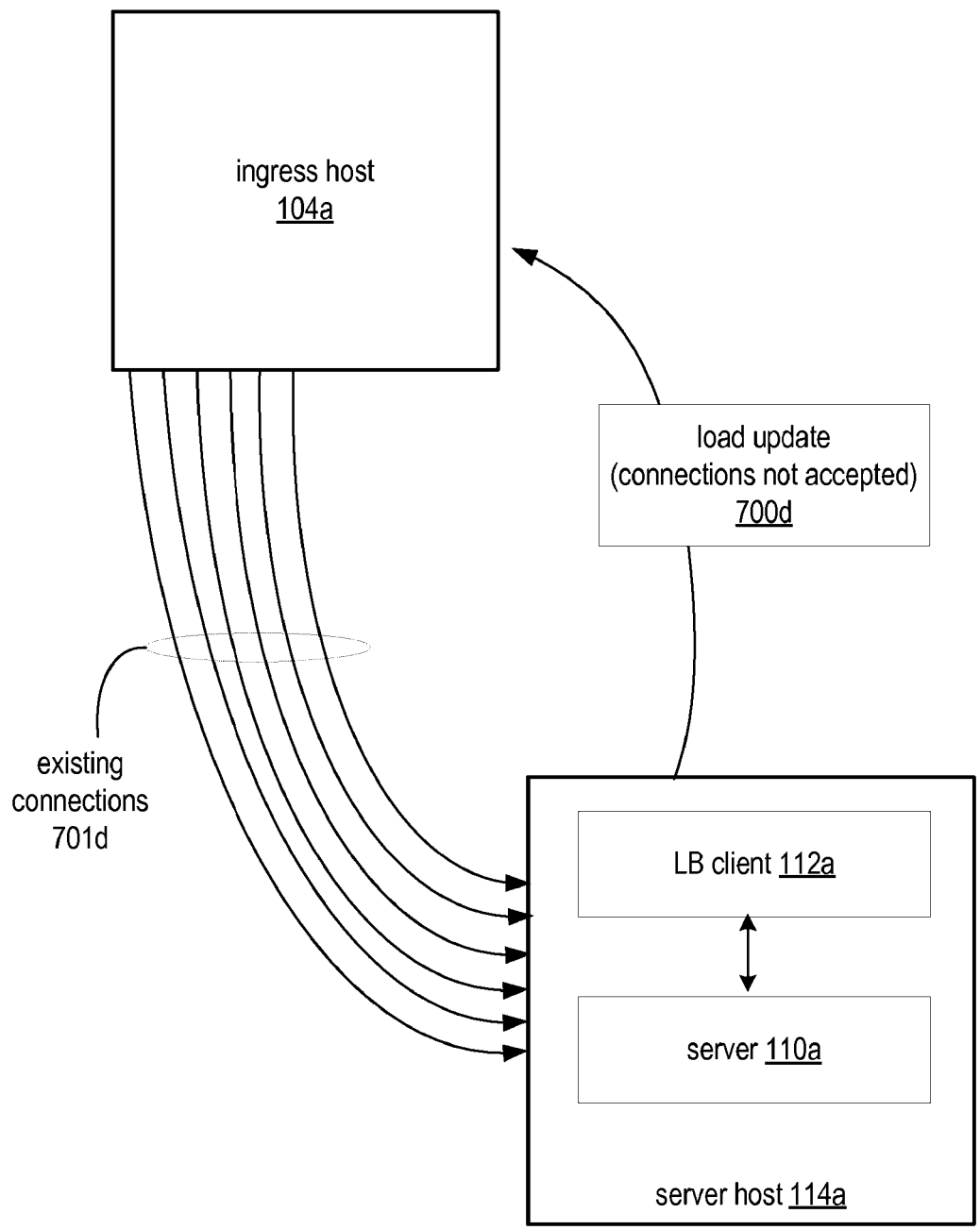

FIGS. 7A-7D illustrate flow diagrams demonstrating how the quantity of connections sent to a given server host varies over time as that server host provides updated load information to the ingress hosts. In FIG. 7A, server host 114a provides ingress host 104a with a load update that indicates the server host is lightly loaded with existing connection(s) 701a. As the ingress host 104a takes the load update into consideration when performing the load balancing protocol, the ingress host 104a may assign the server host with a relatively large quantity of new connections 702a. In FIG. 7B, server host 114a provides ingress host 104a with a load update that indicates the server host is now moderately loaded with existing connections 701b. As the ingress host 104a takes the load update into consideration when performing the load balancing protocol, the ingress host 104a may assign the server host fewer connections, which will result in server host 114a being loaded with fewer new connections 702b as at least some of the connections decay without being replaced by new connections. In FIG. 7C, server host 114a provides ingress host 104a with a load update that indicates the server host is now heavily loaded with existing connections 701c. As the ingress host 104a takes the load update into consideration when performing the load balancing protocol, the ingress host 104a may assign the server host even fewer connections, which will result in server host 114a being loaded with even fewer new connection(s) 702c as many connections decay without being replaced by new connections. In FIG. 7D, server host 114a provides ingress host 104a with a load update that indicates the server host is not currently accepting new connections (e.g., because the host is too heavily loaded with existing connections 701d or otherwise does not want additional connections). As the ingress host 104a takes the load update into consideration when performing the load balancing protocol, the ingress host 104a may cease to assign the server host with new connections, which will result in server host 114a being loaded with no connections from ingress host 104a as connections 702d completely decay.

In various embodiments, each ingress sever may also be configured to automatically cease assigning new connections to a specific server host if the ingress host has not received a load update from that server host within a certain threshold period of time. For example, the server hosts may be configured to send load updates as period heartbeat messages. If an ingress server determines that a specific server host has not sent a heartbeat within a specified period of time (e.g., a period of time set by an administrator or a period of time dynamically determined by the ingress host itself), the specific ingress server may cease assigning new connections to that server host. Note that ingress server may continue to forward packets for existing connections to the server host. However, as those existing connections die out over time, the ingress server will have no active connections routed to the host server (unless the host server sends another heartbeat message that indicates it is health enough to accept new connections).

As demonstrated by FIGS. 7A-7D, while the load balancer of the ingress host may perform load balancing according to a load balancing protocol in order to assign new connections to different server hosts, each server host can largely control the load (e.g., quantity of connections) exerted on that host by reporting specific load updates to the ingress host. For instance, to throttle its own load down, the server host may provide (to a specific ingress host) a load update that indicates it is heavily loaded or that it is no longer accepting new connections. In various embodiments, a server host may utilize this technique to control the quantity of connections it receives from each individual ingress host in various embodiments.

Figure 8A:
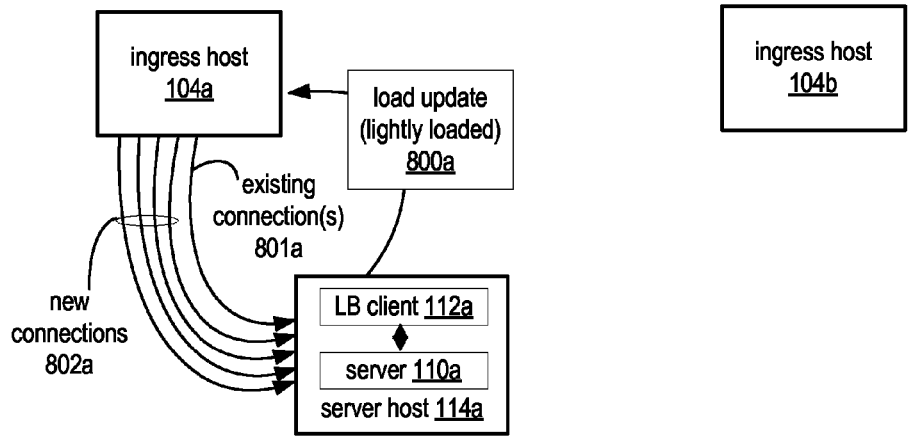
FIG. 8A-8C illustrate flow diagrams that demonstrate a server host using load updates to transition its source of connections from one ingress host to another, according to some embodiments.
Figure 8B:
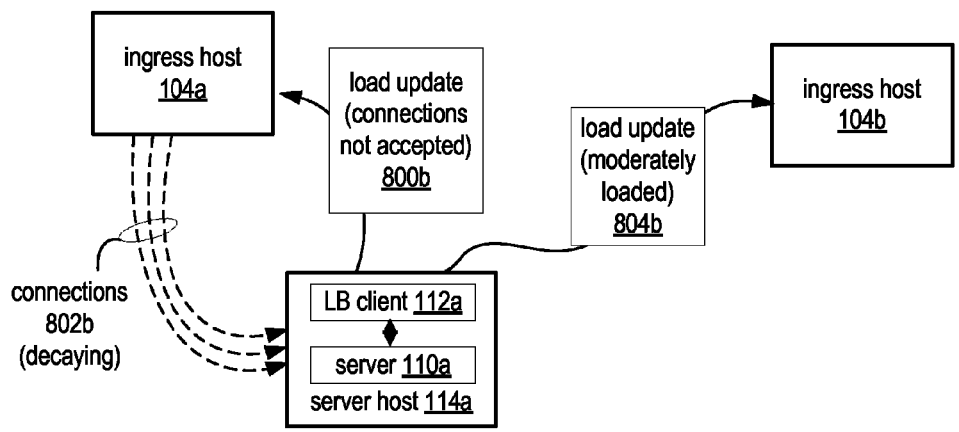
Figure 8C:
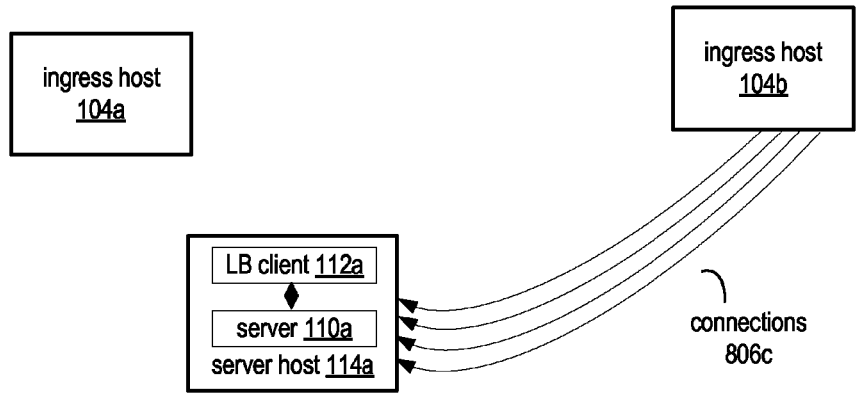

FIGS. 8A-8C illustrate flow diagrams demonstrating how a server host may transition its source of connections from one load balancer to another in various embodiments. In FIG. 8A, server host 114a has used a load update 800a to indicate to ingress host that the server is lightly loaded with existing connection(s) 801a. As the server host has capacity to spare, the ingress host assigns new connections 802a to the server host in accordance with the load balancing protocol described herein. Also note that, in FIG. 8A, the server host 114a does not provide load updates to ingress host 104b and ingress host 104b does not assign new connections to that server host.

In FIGS. 8B-8C, server host 114a may transition the source of its connections from ingress host 104a to ingress host 104b. In various embodiments, this type of configuration change may be performed without quiescing server host 114a (e.g., without killing the active connections handled by server host 114a). In other words, the server hosts are not locked into a particular ingress host (and can even concurrently accept connections from multiple ingress hosts). In the illustrated embodiment, server host 114a provides a load update 800b to ingress host 104a to indicate that the server host is no longer accepting new connections from that ingress host. As such, the quantity of connections 802b will decay until no connection is routed through ingress host 104a to server host 114a. Server host 114a may also provide a load update 804b to ingress host 104b that indicates the server host is moderately loaded (or otherwise has some capacity to receive connections from that ingress host). Depending on the current load of the other server hosts, ingress host 104b may begin to assign at least some connections 806c to server host 114a, as illustrated in FIG. 8C. Note that connections 802b were closed by either server host 114a or the respective remote client; the connections were not prematurely killed by ingress host 104a. As the capacity of the server host 114a has improved, ingress server 104b may assign additional connections 806c to the server host. As demonstrated by the operations of FIGS. 8A-8C, server host 114a may use load updates to successfully change the source of connections from one ingress host to another. In various embodiments, similar techniques may be utilized to control the flow of incoming connections in other ways. For instance, the server host might provide load updates to multiple ingress hosts in order to concurrently receive new connections from multiple ingress hosts.

Figure 9:
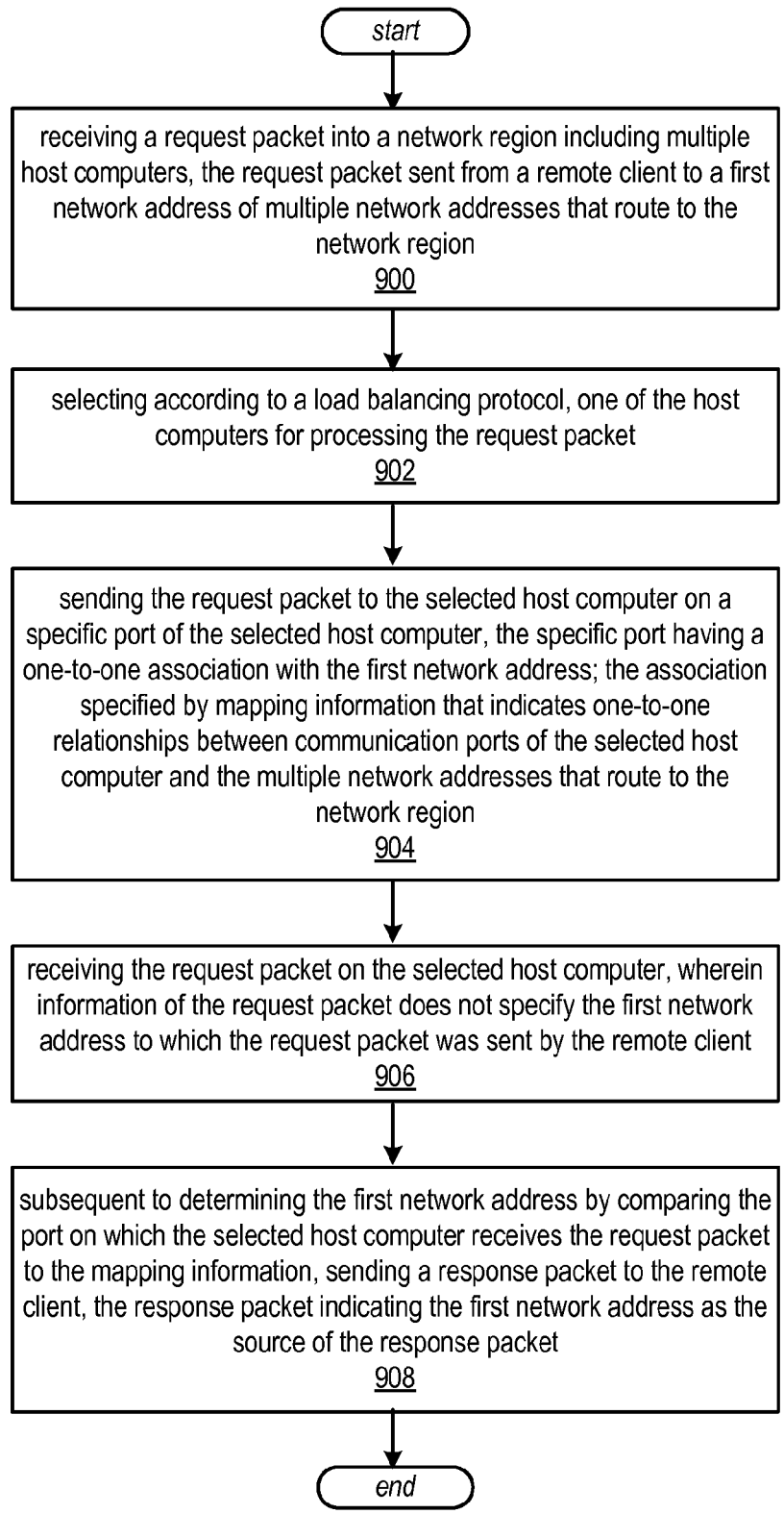
FIG. 9 illustrates a flow chart of an example method for processing a request packet including tracking the packet's original destination address through the use of one-to-one mappings between ports and different network addresses, according to some embodiments.

The system and method for distributed load balancing with load balancer clients for hosts may include various methods, examples of which are described in more detail below. In various embodiments, the illustrated methods may be performed by one or more computer systems, such as computer 1200 of FIG. 12 described below. FIG. 9 illustrates an example method for processing a request packet including tracking the packet's original destination address through the use of one-to-one mappings between ports and different network addresses serviced by the system described herein. As illustrated by block 900, the method may include receiving a request packet into a particular network region that includes multiple host computers. The request packet may be sent from a remote client to a first network address of multiple network addresses that route to the particular network region. For instance, one example of this type of request packet includes request packet 200. In this specific example, the first network address may be 172.1.1.1:80, which is the address to which the client sent the request packet. As illustrated by block 902, the method may include selecting according to a load balancing protocol, one of the host computers for processing the request packet. For instance, this portion of the method may include applying any of the load balancing protocols described above. In one-non limiting example, a round-robin load balancing protocol may be utilized in conjunction with load updates from various host computers in order to select a specific host computer that is to receive the request packet.

As illustrated at 904, the method may also include sending the request packet to the selected host computer on a specific port of the selected host computer. In various embodiments, this specific port may have a one-to-one association with the first network address and this association may be specified by mapping information that indicates one-to-one relationships between communication ports of the selected host computer and the multiple network addresses that route to the particular network region. For instance, examples of this mapping information are described as being stored within configuration data store 116 in various embodiments. An example of sending a request packet to this type of port is illustrated by the transfer of packet 200 from ingress server 104a to LB client 112a (FIG. 2). In this example, the host computer address is 10.2.2.2 and the specific port number is 4001.

As illustrated at block 906, the method may include receiving the request packet on the selected host computer. Note that in various embodiments the information of the request packet does not specify the first network address to which the request packet was sent by the remote client. For instance, as described above the first network address (e.g., the address to which the client sent the packet) may be determined by the port on which the packet is received and the mapping information from the configuration data store.

As illustrated at block 908, the method may include, subsequent to determining the first network address by comparing the port on which the selected host computer receives the request packet (e.g., port 4001 in FIG. 2) to the mapping information, sending a response packet to the remote client, the response packet indicating the first network address as the source of the response packet. For instance, in FIG. 2, the source address of the response packet 202 is indicated as 172.1.1.1:80 (the same address to which the client originally sent the corresponding request packet) even though the egress host (address 10.3.3.3) actually sent the response packet. In this way, from the clients perspective, the response packet appears to originate from the same address to which the original request packet was sent by the client.

Figure 10:
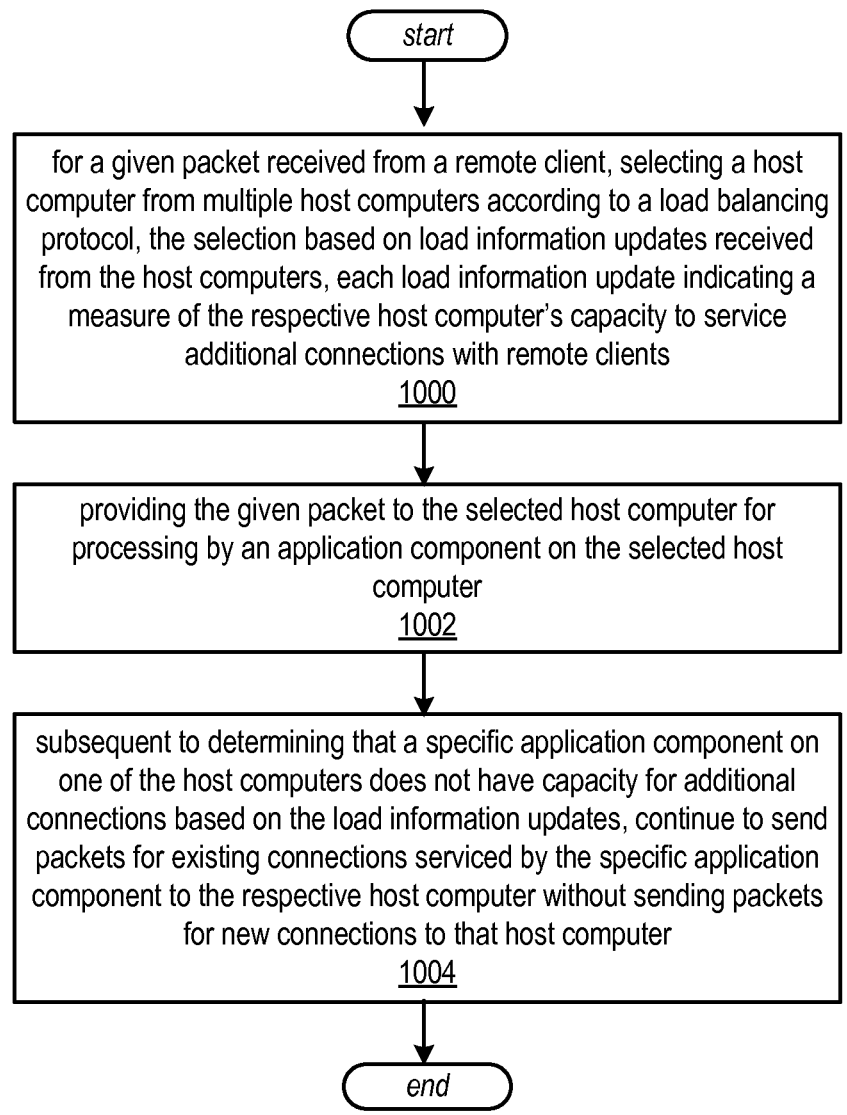
FIG. 10 illustrates an example method performing a load balancing technique for allocating connections away from a particular server host without closing existing connections for that host, according to some embodiments.

FIG. 10 illustrates an example method performing a load balancing technique for allocating connections away from a particular server host without closing existing connections for that host. As illustrated at block 1000, the method may include, for a given packet received from a remote client, selecting a host computer of a plurality of host computers according to a load balancing protocol. In general, this portion of the method may include utilizing any of the load balancing protocols described above in regard to selecting server host. In various embodiments, the selection is also based on load information updates (e.g., load updates 600, 702a-d, 802a-b, 806b-c) received from the host computers (e.g., from the LB clients of the server hosts described herein). In various embodiments, each load information update may indicate a measure of the respective host computer's capacity to service additional connections with remote clients. For example, as described above, load information updates may specify a quantity or number of connections a host computer is willing to take on. In another example, load updates may specify whether a host computer (e.g., a server host 114) is lightly, moderately, or heavily loaded or not accepting any connections. In other cases, the load updates may specify metrics for inferring the host computers capacity to accept additional connections. For instance, a given load update may specify a current number of active connections on the host, current bandwidth utilization of the host, current processor utilization of the host, current memory utilization of the host, or some other performance metric associated with the host. As illustrated at block 1002, the method may include providing the given packet to the selected host computer for processing by an application component on the selected host computer. For instance, an example of delivering the given packet may include providing the request packets described above to specific servers hosts for processing by one of servers 110a-d.

As illustrated at block 1004, the method may also include, subsequent to determining that a specific application component on one of the host computers does not have capacity for additional connections based on the load information updates, continue to send packets for existing connections serviced by the specific application component to the respective host computer without sending packets for new connections to that host computer. For instance, as described above, when an ingress server determines that a server host does not have capacity for new connections, the ingress server may continue sending packets for existing connection to that server host while ceasing assignment of new connections to that server host.

Figure 11:
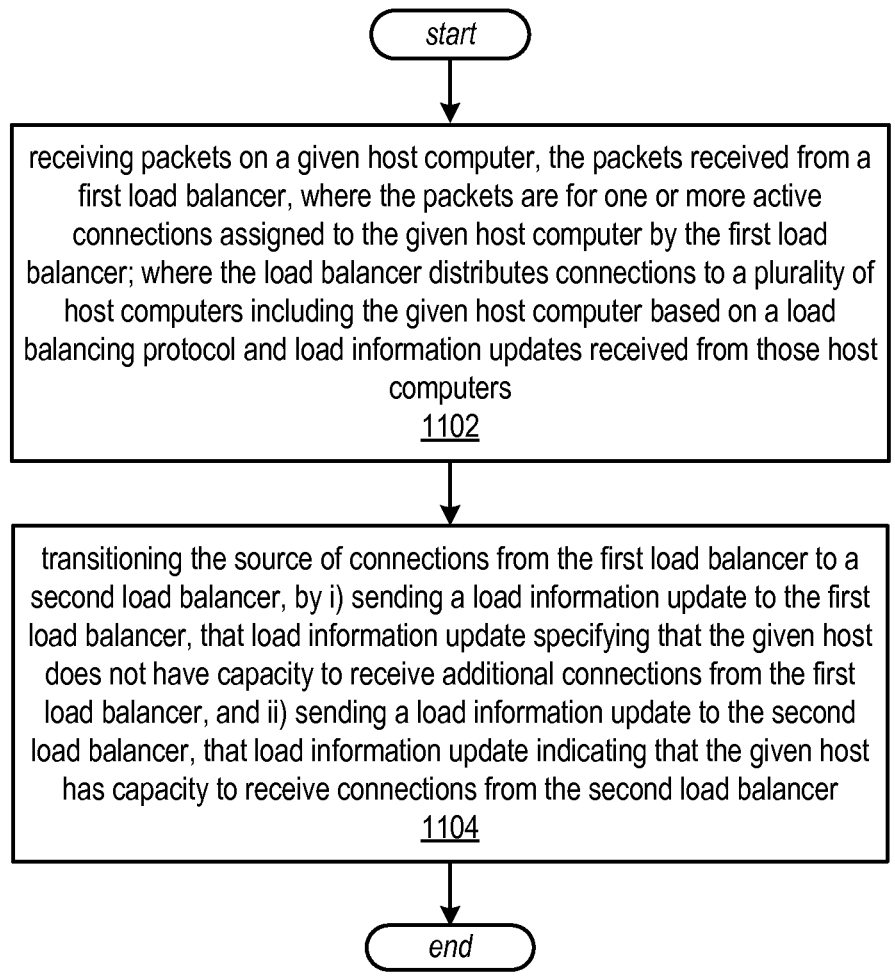
FIG. 11 illustrates an example method for transitioning the source of connections for a given host computer (e.g., a server host) from one load balancer to another load balancer, according to some embodiments.

FIG. 11 illustrates an example method for transitioning the source of connections for a given host computer (e.g., a server host) from one load balancer to another load balancer. In various embodiments, this method may be performed by an individual server host. For instance, the LB clients described herein may be configured to perform the illustrated method in order to transition from one load balancer to another.

As illustrated at block 1100, the method may be performed by a given host computer. Furthermore, the method may include receiving from a first load balancer, packets for one or more active connections assigned to the given host computer by the first load balancer. For instance, this portion of the method may include receiving packets that a first load balancer forwards in accordance with a forwarding table, as described above. As described above, the load balancer (e.g., load balancer 400) may distribute connections to multiple host computers including the given host computer based on a load balancing protocol and load information updates received from those host computers. In various embodiments, this property of the load balancer may be leverage to enable a server host to control the quantity of connections that it receives from a particular load balancer. In fact, as noted below with respect to block 1102, techniques may be employed to transition the source of connection from one load balancer to another (e.g., from one ingress host to another).

As illustrated at block 1102, the method may include transitioning the source of connections from the first load balancer to a second load balancer, by i) sending to the first load balancer a load information update that indicates the given host does not have capacity to receive additional connections from the first load balancer, and ii) sending to the second load balancer a load information update that indicates that the given host has capacity to receive connections from the second load balancer. For instance, one example of transitioning the source of connections in this manner is illustrated by the transition from ingress server 104a to ingress server 104b in FIGS. 8A-8B.

Example Computer System

Various embodiments of the system and method for distributed load balancing with load balancer clients for hosts, as described herein, may be executed on one or more computer systems, which may interact with various other devices. Note that any component, action, or functionality described above with respect to FIGS. 1-11 may be implemented on one or more computers configured as computer system 1200 of FIG. 12, according to various embodiments. For instance, in one embodiment, a computer similar to computer system 1200 may be utilized to implement any of the clients, ingress hosts, egress hosts, or server hosts (and any component or elements thereof) described above. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 and/or data 1232 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement any functionality of the clients, ingress hosts, egress hosts, or server hosts (and any component or elements thereof) described above including but not limited to the load balancers and LB clients. Additionally, data 1232 of memory 1220 may store any of the information or data structures described above, including but not limited to packets, mapping information, forwarding tables, server host states, and load updates. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., any element of FIG. 1-11) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In some embodiments, the network(s) 102 of FIG. 1 and FIG. 2 may include one or more networks configured in a manner similar to that of network 1285. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

Figure 12:
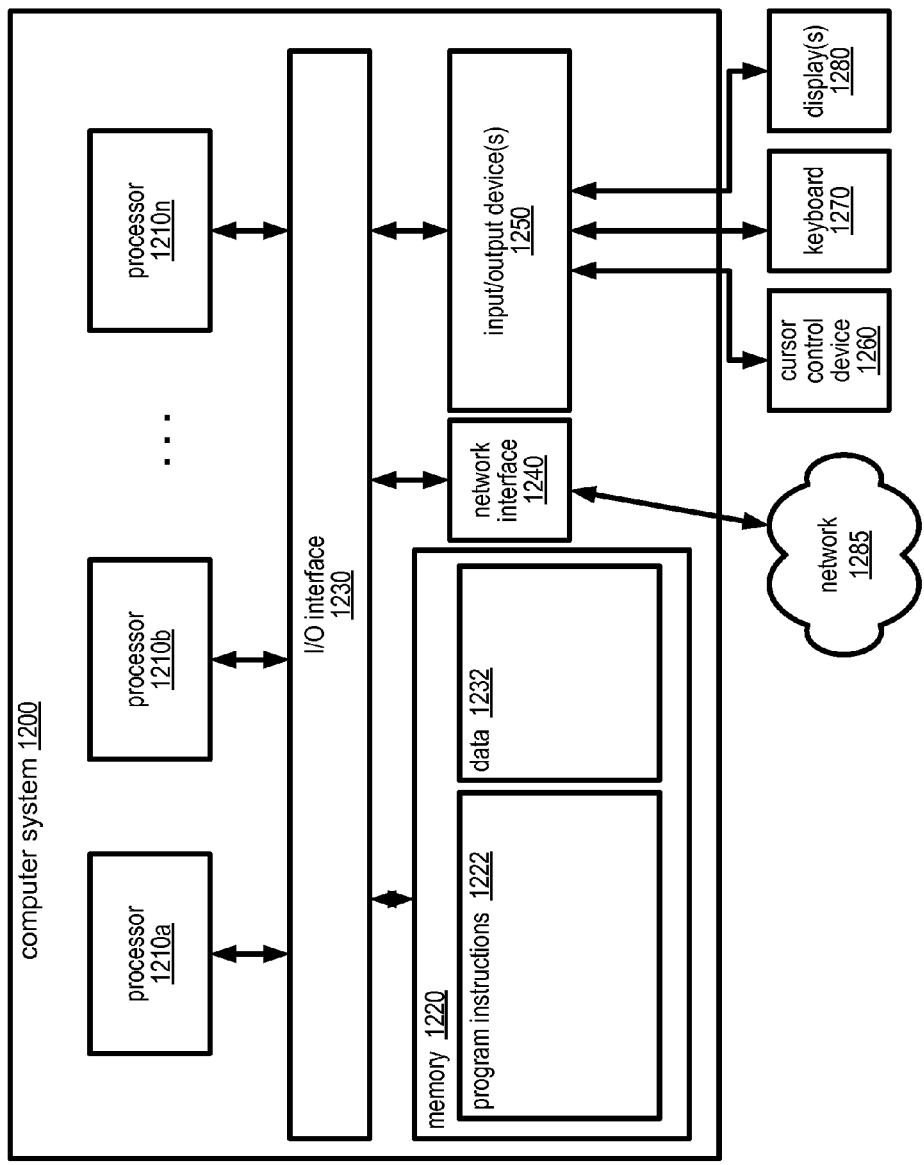
FIG. 12 illustrates one example of a computer system suitable for implementing various elements of the system and method for distributed load balancing with load balancer clients for hosts, according to some embodiments.

As shown in FIG. 12, memory 1220 may include program instructions 1222, which may be processor-executable to implement any element or action described above. In one embodiment, the program instructions may implement the methods described above, such as the methods illustrated by FIGS. 9-11. In other embodiments, different elements and data may be included. Note that data 1232 may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link.

Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A non-transitory computer-readable storage medium, storing program instructions computer-executable on a given host computer to implement a load balancer client configured to:
   receive from a first load balancer, packets for one or more active connections assigned to the given host computer by the first load balancer; wherein the load balancer distributes connections to a plurality of host computers including the given host computer based on a load balancing protocol and load information updates received from those host computers;
   transition the source of connections for the given host computer from the first load balancer to a second load balancer, wherein to perform the transition the load balancer client is configured to:
   send a load information update to the first load balancer, wherein that load information update specifies that the given host does not have capacity to receive additional connections from the first load balancer; and
   send a load information update to the second load balancer, wherein that load information update indicates that the given host has capacity to receive connections from the second load balancer.

2. The non-transitory computer-readable storage medium of claim 1, wherein the load balancer client on the given host computer is configured to:
   receive connections with remote clients through multiple load balancers, and
   transition the given host computer to an offline state by sending to each those load balancers, a load information update that specifies that the given host does not have capacity to receive additional connections.

3. The non-transitory computer-readable storage medium of claim 1, wherein the packets for one or more active connections comprise encrypted information, wherein the load balancer client is configured to decrypt the encrypted information and provide the decrypted information to an application component that resides on the given host computer.

4. The non-transitory computer-readable storage medium of claim 1, wherein the load balancer client is further configured, prior to sending the load information update to the second load balancer, to generate the load information update for the second load balancer.

5. A method performed on a given host computer, the method comprising:
   receiving from a first load balancer and a second load balancer, packets for one or more active connections assigned to the given host computer by the first load balancer and the second load balancer; wherein each load balancer distributes connections to a plurality of host computers including the given host computer based on a load balancing protocol and load information updates received from those host computers;

individually controlling a quantity of additional connections from the first load balancer and the second load balancer, wherein said controlling comprises:

sending a load information update to the first load balancer, wherein that load information update specifies the given host computer's capacity to receive additional connections from the first load balancer; and sending a load information update to the second load balancer, wherein that load information update indicates the given host computer's capacity to receive additional connections from the second load balancer.

6. The computer-implemented method of claim 5, wherein the packets for one or more active connections comprise encrypted information, wherein the method comprises decrypting the encrypted information and providing the decrypted information to an application component that resides on the given host computer.

7. The computer-implemented method of claim 5, wherein each load information update is specific to a different port on the given host computer.

8. The method of claim 5, wherein the load information update to the first load balancer indicates a quantity of additional connections the given host computer will accept from the first load balancer on a particular port of the given host computer.

9. The method of claim 5, wherein the load information update to the first load balancer indicates a number of active connections at the given host computer, an aggregate bandwidth at the given host computer, a processor utilization at the given host computer, another performance metric of the given host computer, or any combination thereof.

10. The method of claim 8, wherein the load information update to the first load balancer indicates a different quantity of additional connections the given host computer will accept from the first load balancer on a different particular port of the given host computer.

11. The method of claim 8, wherein the load information update to the second load balancer indicates a different quantity of additional connections the given host computer will accept from the second load balancer on the particular port of the given host computer.

12. The non-transitory computer-readable storage medium of claim 8, wherein, to generate the load information update for the second load balancer, the load balancer client is configured to indicate that the given host computer is lightly loaded, moderately loaded, or heavily loaded.

13. The non-transitory computer-readable storage medium of claim 8, wherein, to generate the load information update for the second load balancer, the load balancer client is not configured to indicate a number of additional connections from the second load balancer that the given host computer will accept.

14. A system, comprising:
at least one processor; and
a memory coupled to the at least one processor, wherein the memory stores instructions, and wherein the instructions, when executed by the at least one processor, cause the at least one processor to implement a server host configured to:

receive, from one or more of a plurality of load balancers, an assignment of one or more connections to one or more respective host computers, wherein the one or more connections provide one or more packets from the one or more respective host computers; and individually control a quantity of additional connections from a particular load balancer and a different load balancer of the plurality of load balancers, comprising:

sending a particular load information update to the particular load balancer, wherein the particular load information update indicates a capacity to receive at least a particular number of additional connections from the particular load balancer; and sending a different load information update to the different load balancer, wherein the different load information update indicates a capacity to receive at least a different number of additional connections from the different load balancer.

15. The system of claim 14, wherein, to individually control the quantity of additional connections, the server host is further configured to determine the particular load information update based at least in part on a number of active connections at the server host, a current processor utilization of the server host, a current memory utilization of the server host, another performance metric of the server host, or any combination thereof.

16. The system of claim 14, wherein, to send the particular load information update, the server host is configured to indicate a load level of the server host from a predefined scale of multiple load levels.

17. The system of claim 14, wherein the server host is configured to indicate, via the particular number, a capacity to receive at least one additional connection, and to indicate, via the different number, no capacity to receive additional connections.

18. The system of claim 14, wherein the server host is configured to send the particular load information update and the different load information update proactively.

19. The system of claim 14, wherein the server host is configured to indicate, to the particular load balancer via the particular load information update, that the server host is online.

20. The system of claim 16, wherein the predefined scale includes indications that the server host is lightly loaded, moderately loaded, heavily loaded, or is not accepting additional connections.

* * * * *